US006621222B1

(12) United States Patent
Hong

(10) Patent No.: US 6,621,222 B1
(45) Date of Patent: Sep. 16, 2003

(54) POWER-SAVING LAMP

(76) Inventor: Kun-Liang Hong, 2/F., No. 81, Lane 106, Paochien Rd., Chungho City, Taipei County (TW)

( * ) Notice: Subject to any disclaimer, the term of this patent is extended or adjusted under 35 U.S.C. 154(b) by 0 days.

(21) Appl. No.: 10/279,797

(22) Filed: Oct. 25, 2002

(30) Foreign Application Priority Data

May 29, 2002 (TW) ...................................... 91207811 U

(51) Int. Cl.[7] ............................ H01K 1/62; B60Q 3/04

(52) U.S. Cl. .......................... 315/51; 315/56; 315/272; 315/287; 315/291; 315/307; 362/252; 362/800

(58) Field of Search ........................ 315/51, 56, 200 R, 315/246, 272, 287, 291, 307; 340/815.45, 815.73; 362/235, 236, 238, 240, 249, 252, 800

(56) References Cited

U.S. PATENT DOCUMENTS

| | | | | | |
|---|---|---|---|---|---|
| 4,211,955 | A | * | 7/1980 | Ray | 315/53 |
| 4,298,869 | A | * | 11/1981 | Okuno | 345/82 |
| 5,655,830 | A | * | 8/1997 | Ruskouski | 362/240 |
| 5,688,042 | A | * | 11/1997 | Madadi et al. | 362/240 |
| 5,726,535 | A | * | 3/1998 | Yan | 315/185 R |
| 5,921,660 | A | * | 7/1999 | Yu | 362/249 |
| 5,949,347 | A | * | 9/1999 | Wu | 340/815.45 |
| 6,227,679 | B1 | * | 5/2001 | Zhang et al. | 362/236 |
| 6,525,668 | B1 | * | 2/2003 | Petrick | 340/815.45 |
| 6,550,953 | B1 | * | 4/2003 | Ichikawa et al. | 362/800 |

OTHER PUBLICATIONS

United States patent application Publication, Pub. No. US 2003/0031015 A1, Ishibashi, Pub. date Feb. 13, 2003.*

* cited by examiner

*Primary Examiner*—Don Wong
*Assistant Examiner*—Thuy Vinh Tran
(74) *Attorney, Agent, or Firm*—Rosenberg, Klein & Lee

(57) ABSTRACT

A power-saving lamp is constructed to include a lamp head, a bulb fastened to the lamp head, a polygonal light emitting circuit assembly suspended from a bracket in the lamp head within the bulb, the polygonal light emitting circuit assembly having LEDs in each of the peripheral sidewalls thereof, and a power control circuit board mounted in the lamp head and electrically connected between the lamp head and the polygonal light emitting circuit assembly to convert input AC power from the lamp head into the desired working voltage for the polygonal light emitting circuit assembly.

4 Claims, 4 Drawing Sheets

POWER-SAVING LAMP

BACKGROUND OF THE INVENTION

1. Field of the Invention

The present invention relates to electric lamps and, more particularly, to a power-saving lamp.

2. Description of the Related Art

Conventional incandescent lamp bulbs commonly use a filament (tungsten) to produce light. These incandescent lamp bulbs consume much power and produce much heat during operation. Further, these incandescent lamp bulbs have a short serving life. There are also commercially available gas-filled power-saving lamp bulbs. However, the power saving efficiency of these power-saving lamp bulbs is still not satisfactory. These power-saving lamp bulbs also produce heat during working and, have a limited service life.

SUMMARY OF THE INVENTION

The present invention has been accomplished to provide a power-saving lamp, which eliminates the aforesaid drawbacks. It is the main object of the present invention to provide a power-saving lamp, which consumes less power during working. It is another object of the present invention to provide a power-saving lamp, which does not produce much heat during working. It is still another object of the present invention to provide a power-saving lamp, which is durable in use. According to one aspect of the present invention, the power-saving lamp comprises a lamp head, a bulb fastened to the lamp head, a light emitting circuit assembly suspended from a bracket in the lamp head within the bulb, the light emitting circuit assembly having LEDs in each of the peripheral sidewalls thereof, and a power control circuit board mounted in the lamp head and electrically connected between the lamp head and the light emitting circuit assembly to convert input AC power from the lamp head into the desired working voltage for the light emitting circuit assembly. According to another aspect of the present invention, the light emitting circuit assembly is formed of a polygonal circuit board that can be made having a triangular, rectangular, or hexagonal profile.

DETAILED DESCRIPTION OF THE PREFERRED EMBODIMENT

Figure 1:
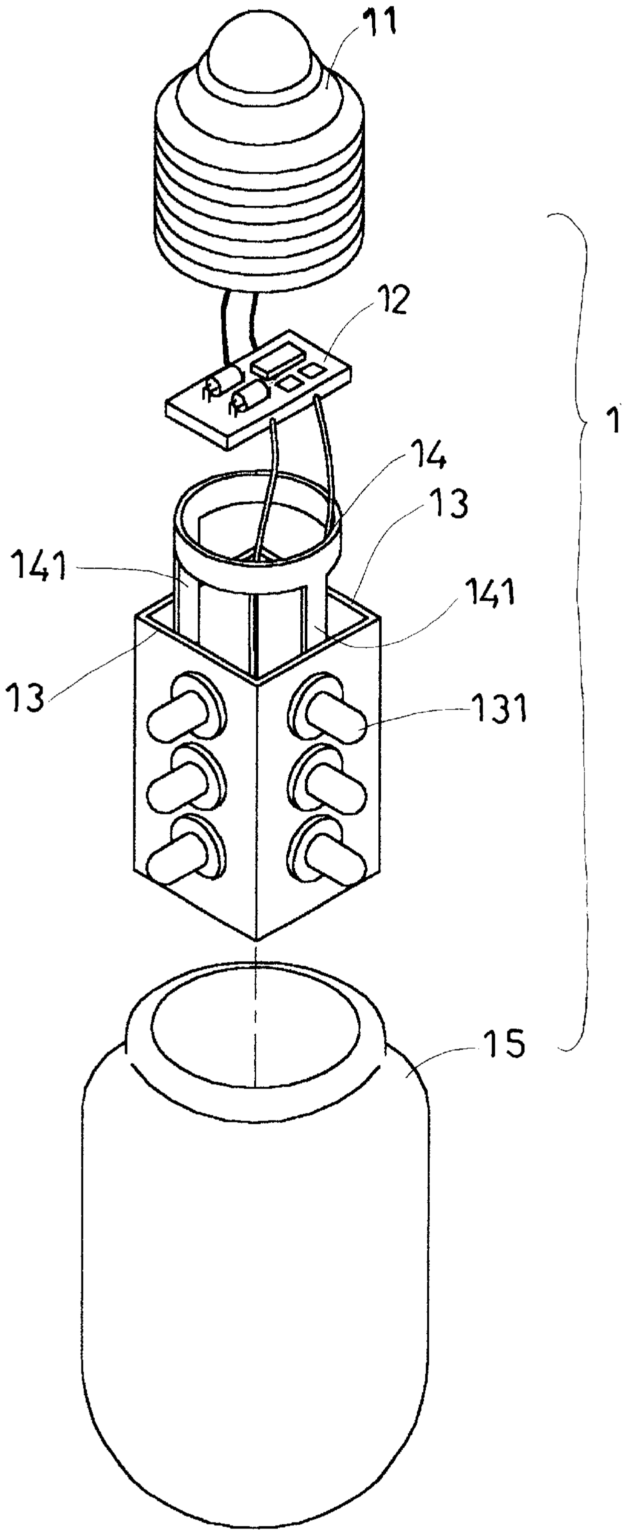
FIG. 1 is an exploded view of a power-saving lamp according to the present invention.
Figure 2:
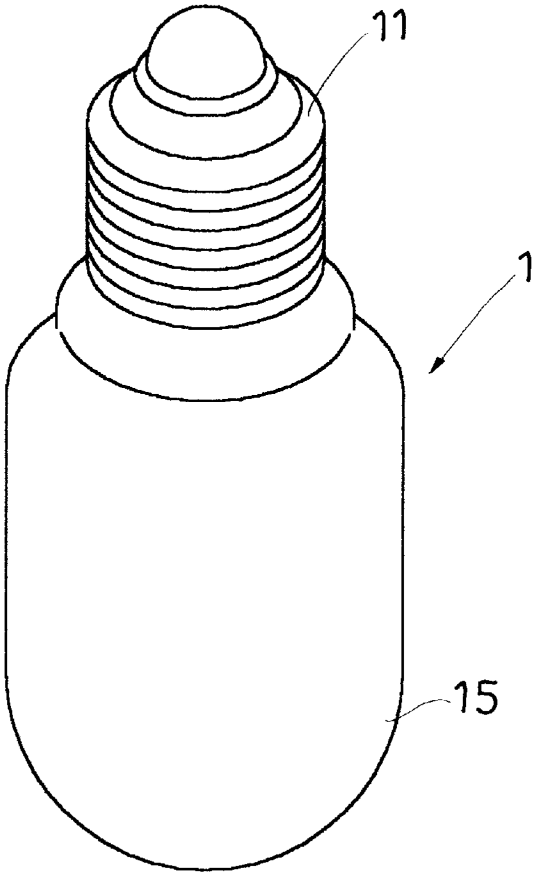
FIG. 2 is a plain view showing the outer appearance of the power-saving lamp according to the present invention.
Figure 3:
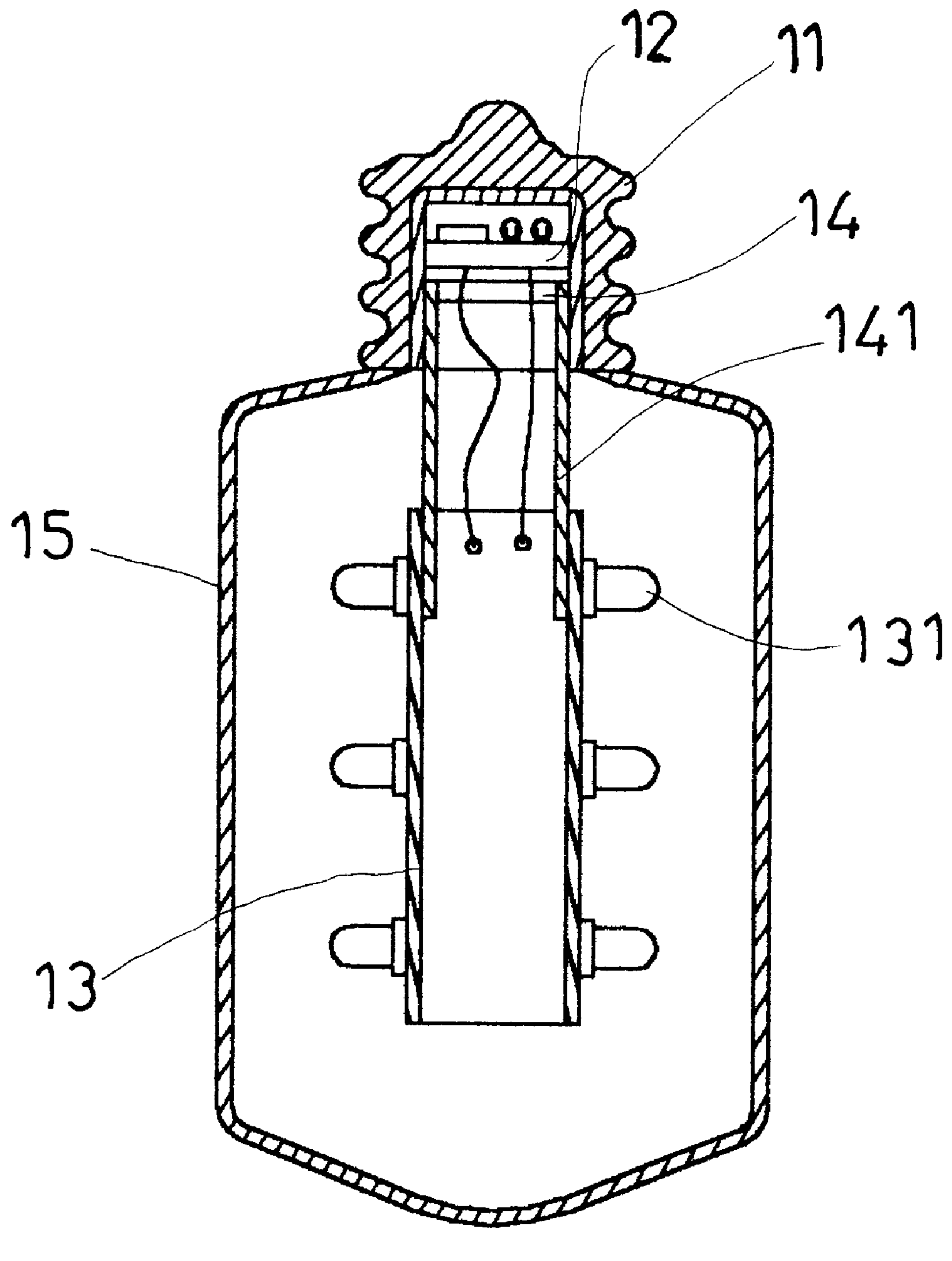
FIG. 3 is a sectional view of the power-saving lamp according to the second coupling member.

Referring to FIGS. 1~3, a power-saving lamp 1 is shown comprised of a lamp head 11 ,a power control circuit board 12, a light emitting circuit assembly 13, a bracket 14, and a bulb 15. This lamp is intended for use in an incandescent lamp socket.

Figure 6:
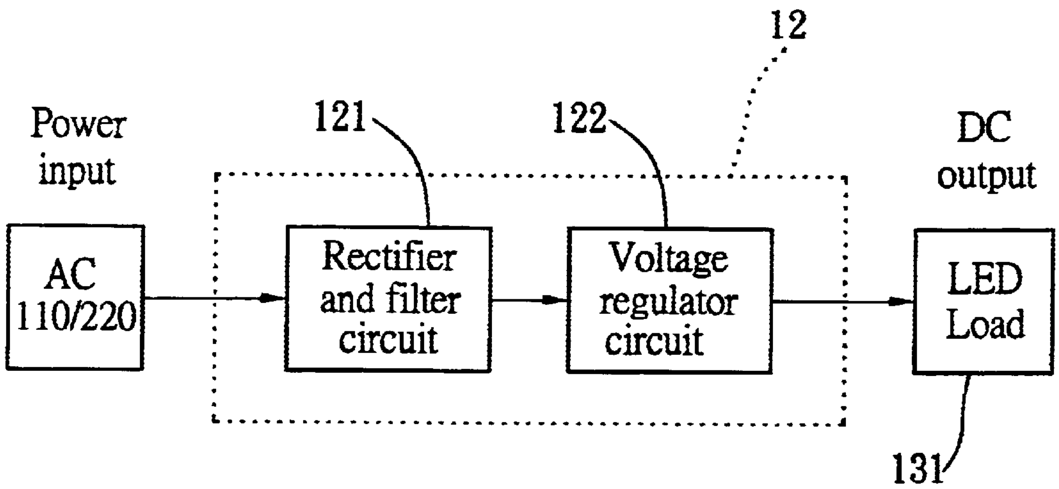
FIG. 6 is a circuit block diagram of the present invention.

The power control circuit board 12 is fixedly mounted inside the lamp head 11, comprised of a rectifier and filter circuit 121 and a voltage regulator circuit 122 electrically connected in series between the lamp head 11 and the light emitting circuit assembly 13, and adapted to convert input AC110V or AC 220V from the lamp head 11 into the desired working voltage for the light emitting circuit assembly 13 (see FIG. 6). The light emitting circuit assembly 13 is a hollow polygonal circuit board having a plurality of LEDs (light emitting diodes) in each of the peripheral walls thereof. The bracket 14 is fixedly fastened to the inside of the lamp head 11, having a plurality of bottom legs 141 respectively fastened to the inside wall of the light emitting circuit assembly 13. The bulb 15 is a transparent hollow shell fixedly fastened to the lamp head 11 to shield the power control circuit board 12, the light emitting circuit assembly 13, and the bracket 14. The bulb 15 can be made of glass, plastics, or any suitable material that admits light.

Figure 4:
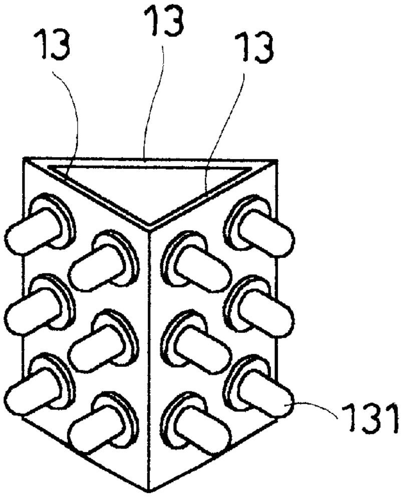
FIG. 4 is an elevational view of an alternate form of the light emitting circuit assembly for the power-saving lamp according to the present invention.
Figure 5:
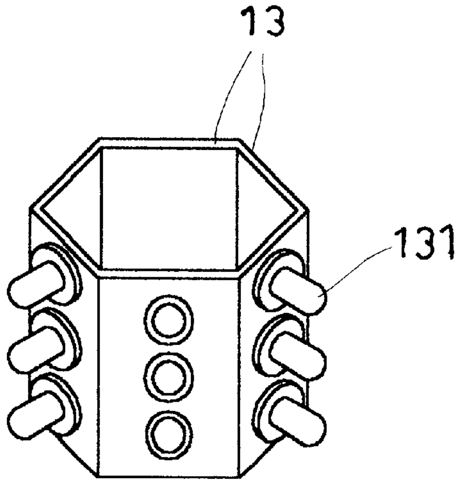
FIG. 5 is an elevational view of another alternate form of the light emitting circuit assembly for the power-saving lamp according to the present invention.

Referring to FIGS. 4 and 5 and FIG. 1 again, the polygonal light emitting circuit assembly 13 can be made having a rectangular profile as shown in FIG. 1, a triangular profile as shown in FIG. 4, or a hexagonal profile as shown in FIG. 5.

A prototype of power-saving lamp has been constructed with the features of FIGS. 1~6. The power-saving lamp functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A power-saving lamp comprising:

a lamp head for connection to an electric socket to receive AC power supply;

a bulb fastened to said lamp head, said bulb admitting light;

a bracket fixedly mounted in said lamp head;

a polygonal light emitting circuit assembly mounted on said bracket inside said bulb, said light emitting circuit assembly having a plurality of light emitting diodes located in each of peripheral walls thereof; and a power control circuit board fixedly mounted inside said lamp head, said power control circuit board being comprised of a rectifier and filter circuit and a voltage regulator circuit electrically connected in series between said lamp head and said polygonal light emitting circuit assembly, and adapted to convert input AC power supply from said lamp head into a working voltage for said polygonal light emitting circuit assembly.

2. The power-saving lamp as claimed in claim 1, wherein said polygonal light emitting circuit assembly has a rectangular profile.

3. The power-saving lamp as claimed in claim 1, wherein said polygonal light emitting circuit assembly has a triangular profile.

4. The power-saving lamp as claimed in claim 1, wherein said polygonal light emitting circuit assembly has a hexagonal profile.

* * * * *